United States Patent
Xie et al.

(10) Patent No.: US 9,531,480 B2
(45) Date of Patent: Dec. 27, 2016

(54) OPTICAL RECEIVER

(71) Applicant: Huawei Technologies Co., Ltd., Shenzhen (CN)

(72) Inventors: Changsong Xie, Munich (DE); Ming Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/633,761

(22) Filed: Feb. 27, 2015

(65) Prior Publication Data

US 2015/0171972 A1 Jun. 18, 2015

Related U.S. Application Data

(63) Continuation of application No. PCT/EP2012/066649, filed on Aug. 28, 2012.

(51) Int. Cl.
*H04B 10/61* (2013.01)

(52) U.S. Cl.
CPC ........ *H04B 10/6161* (2013.01); *H04B 10/616* (2013.01); *H04B 10/6162* (2013.01)

(58) Field of Classification Search
CPC .............. H04B 10/616; H04B 10/6161; H04B 10/6162
USPC .................................. 398/205, 206, 208, 209
See application file for complete search history.

(56) References Cited

U.S. PATENT DOCUMENTS

| | | | |
|---|---|---|---|
| 6,917,031 B1 | 7/2005 | Sun et al. | |
| 8,260,156 B2 * | 9/2012 | Qian | H04B 10/2513 398/147 |
| 2001/0016885 A1 * | 8/2001 | Happonen | G06F 5/16 710/52 |
| 2004/0067061 A1 | 4/2004 | Jiang et al. | |
| 2011/0002689 A1 | 1/2011 | Sano et al. | |
| 2011/0064421 A1 * | 3/2011 | Zhang | H04B 10/6971 398/208 |
| 2012/0002979 A1 * | 1/2012 | Xie | H04B 10/611 398/208 |
| 2012/0061059 A1 * | 3/2012 | Hsiao | F28D 15/02 165/104.33 |

(Continued)

FOREIGN PATENT DOCUMENTS

| | | |
|---|---|---|
| CN | 1529955 A | 9/2004 |
| CN | 1816183 A | 8/2006 |

(Continued)

OTHER PUBLICATIONS

Geyer, J.C., et al., "Efficient Frequency Domain Chromatic Dispersion Compensation in a Coherent Polmux QPSK-Receiver," Optical Fiber Communication, National Fiber Optic Engineers Conference, Mar. 21-25, 2010, 3 pages.

(Continued)

*Primary Examiner* — Dalzid Singh
(74) *Attorney, Agent, or Firm* — Slater Matsil, LLP (57) ABSTRACT

The invention relates to an optical receiver for processing an optical receive signal the optical receiver comprising a fixed hardware circuit implementing a signal processing part for processing the optical receive signal using a processing parameter; a processor being configured to adaptively update the processing parameter; and a package to integrate the signal processing part and the processor into one chip.

13 Claims, 4 Drawing Sheets

(56) References Cited

U.S. PATENT DOCUMENTS

| | | | | |
|---|---|---|---|---|
| 2012/0128376 A1* | 5/2012 | Sun | ............... | H04B 10/6162 398/208 |
| 2012/0189318 A1* | 7/2012 | Mo | ............... | H04B 10/697 398/152 |
| 2013/0051809 A1* | 2/2013 | Mehrvar | ............ | H04B 10/032 398/208 |
| 2013/0209098 A1 | 8/2013 | Huang et al. | | |
| 2015/0303950 A1* | 10/2015 | Shattil | ............ | H04B 1/0003 370/328 |

FOREIGN PATENT DOCUMENTS

| | | | |
|---|---|---|---|
| CN | 101510818 | A | 8/2009 |
| CN | 101946438 | A | 1/2011 |
| CN | 102308546 | A | 1/2012 |
| WO | 2011130193 | A1 | 10/2011 |

OTHER PUBLICATIONS

Savory, S.J., "Digital Signal Processing for Coherent Systems," Optical Fiber Communication Conference and Exposition, National Fiber Optic Engineers Conference, Mar. 4-8, 2012, 3 pages.

* cited by examiner

OPTICAL RECEIVER

This application is a continuation of International Application No. PCT/EP2012/066649, filed on Aug. 28, 2012, which is hereby incorporated by reference in its entirety.

TECHNICAL FIELD

The present invention relates to an optical receiver, in particular an optical receiver with a fixed hardware circuit and a processor implemented in a package and to an optical transmission system with an optical coherent receiver.

BACKGROUND

In coherent optical transmission, digital coherent receiver with digital signal processing (DSP) is the key enabling technology to realize polarization demultiplexing, demodulation and impairments compensation. In high speed optical transmission, DSP is implemented in hardware as application specific integrated circuit (ASIC) as programmable digital signal processor(s) cannot meet the processing speed requirement.

One of the limiting factors in ASIC development may be the long developing cycle covering the algorithm design, i.e. floating point simulation, fixed-point simulation, offline/real-time verification to chip design, chip silicon foundry, chip debugging, etc. Furthermore, every modification in the algorithm needs to run over the complete procedure round once more. This increases non-recurring engineering (NRE) costs and suffers from time-delay of new product releases. The disadvantage of current art is the inflexibility, i.e., for each update of the DSP algorithm, one has to design and tap-out the chip once more. This produces higher costs and time delay and makes the coherent receiver inflexible with respect to design variations.

Another approach using programmable FPGA has the limited capacity which could not support the data-throughput requirements in 100G coherent receiver applications. For example, the 112 Gbps OTN optical signal with 8 bits and 2 Sa/s will have 1.79 Tbps capacity to be processed. The FPGA devices provided by Xilinx and Altera have limited I/O capacity. Additionally the logical elements in the FPGA could not support the complicated functions. For example, one prototyping from NEC in 2010 ECOC Tu.5.A.2 used 16 cards with FPGAs which could not be used for prototyping nor could it be used for commercialization because of the large size and high cost.

SUMMARY

Embodiments of the invention provide a concept for an optical receiver that is flexible to design variations, in particular flexible to an algorithmic update, and which processing power is similar to an ASIC implementation.

In order to describe the invention in detail, the following terms, abbreviations and notations will be used:
ASIC: Application Specific Integrated Circuit;
DSP: Digital Signal Processing;
FPGA: Field Programmable Gate Array
FDEQ: Frequency Domain Equalizer;
TDEQ: Time Domain Equalizer;
CR: Carrier Recovery;
TR: Timing Recovery;
ADC: Analog-Digital-Converter;
CD: Chromatic Dispersion;
PMD: Polarization Mode Dispersion;
FFT: Fast Fourier Transform;
AGC: Automatic Gain Control;
VCO: Voltage Controlled Oscillator;
FIR: Finite Impulse Response;
Tx: Transmit (direction);
Rx: Receive (direction);
PDM: Polarization Division Multiplexed;
BPSK: Binary Phase Shift Keying;
QPSK: Quaternary Phase Shift Keying;
DBPSK: Differential Binary Phase Shift Keying;
DQPSK: Differential Quaternary Phase Shift Keying;
QAM: Quadrature Amplitude Modulation;
CMA: Constant Modulus Algorithm;
LMS: Least Mean Squares.

According to a first aspect, the invention relates to an optical receiver for processing an optical receive signal, the optical receiver comprising a fixed hardware circuit implementing a signal processing part for processing the optical receive signal using a processing parameter; a processor being configured to adaptively update the processing parameter; and a package to integrate the signal processing part and the processor into one chip.

Flexibility of the optical receiver is achieved by the processing parameter which can be adaptively updated by the processor. The optical receiver can be updated for supporting new features or algorithms and is thus future-safe for processing different algorithms and features. The optical receiver is however implemented as a package integrating the signal processing part and the processor in one chip and hence it is flexible whereas performance rates equivalent to ASIC implementations are achieved.

The processing parameter in this invention is not the fixed configuration which could be realized by pre-defined configurations. Instead, the processing parameter can be updated by the DSP algorithm and is needed to process the real-time input data to get the updated-values because the channel conditions are varying through time and applications. Thus, by using the processing parameter, varying channel conditions through time and applications can be easily processed. One type of real-time change is the real-time change resulting from environments such as the PMD effects in the fiber which change with vibration or the coefficients of the DSP FIR filter that change. Another type of change is the network configuration that is changed when some traffic in neighboring wavelength is added or dropped which may create critical cross-talk or impairments over the existing working wavelength. For example the 10G NRZ non-linear crosstalk to the PDM-QPSK at 50 GHz spacing will cause critical penalty. Such change in wavelength B could not be monitored in fixed ASIC of the wavelength A because the optical DEMUX already separates the optical information before the optical receiver. But when the Network management knows the change, a new algorithm could be configured to deal with the scenarios by the programmable processor. Therefore, by using the processing parameter being adaptively updated by the processor, different kinds of changes can be followed and no new hardware design is necessary.

In a first possible implementation form of the optical receiver according to the first aspect, the fixed hardware circuit is implemented as an application specific integrated circuit.

When implementing the fixed hardware circuit as an ASIC, the processing speed is high compared to a software-implemented solution.

In a second possible implementation form of the optical receiver according to the first aspect as such or according to the first implementation form of the first aspect, the processor is implemented as a multi-core Digital Signal Processor.

Implementing the processor as a multi-core DSP allows to exploit flexibility to change configuration of the hardware or to renew an algorithm used for updating a processing parameter of a signal processing of the hardware circuit.

In a third possible implementation form of the optical receiver according to the first aspect as such or according to the any of the preceding implementation forms of the first aspect, the fixed hardware circuit is configured to implement a chromatic dispersion compensation unit, the processing parameter comprising compensation coefficients of the chromatic dispersion compensation unit.

In a fourth possible implementation form of the optical receiver according to the third implementation form of the first aspect, the chromatic dispersion compensation unit is implemented as a frequency-domain equalizer.

In a fifth possible implementation form of the optical receiver according to the first aspect as such or according to the any of the preceding implementation forms of the first aspect, the fixed hardware circuit is configured to implement a polarization mode dispersion compensation unit, the processing parameter comprising compensation coefficients of the polarization mode dispersion compensation unit.

In a sixth possible implementation form of the optical receiver according to the fifth implementation form of the first aspect, the polarization mode dispersion compensation unit comprises a frequency-domain equalizer.

In a seventh possible implementation form of the optical receiver according to the fifth implementation form of the first aspect, the polarization mode dispersion compensation unit comprises a time-domain equalizer.

In an eighth possible implementation form of the optical receiver according to the first aspect as such or according to the any of the preceding implementation forms of the first aspect, the fixed hardware circuit operates at a higher data rate than the processor.

In a ninth possible implementation form of the optical receiver according to the first aspect as such or according to the any of the preceding implementation forms of the first aspect, the fixed hardware circuit is configured to process the optical receive signal at a symbol rate of the optical receive signal; and wherein the processor is configured to update the processing parameter at a fractional part of the symbol rate of the optical receive signal.

In a tenth possible implementation form of the optical receiver according to the first aspect as such or according to the any of the preceding implementation forms of the first aspect, the fixed hardware circuit and the processor are operated by different clock signals.

In an eleventh possible implementation form of the optical receiver according to the first aspect as such or according to the any of the preceding implementation forms of the first aspect, the processor comprises a program interface for updating a computer program in order to fit different applications or performance requirements, the computer program implementing an adaptation of the processing parameter.

In a twelfth possible implementation form of the optical receiver according to the first aspect as such or according to the any of the preceding implementation forms of the first aspect, the fixed hardware circuit and the processor are implemented on different dies, in particular on dies mounted on top of each other within a single package.

In a thirteenth possible implementation form of the optical receiver according to the first aspect as such or according to the any of the preceding implementation forms of the first aspect, the optical receiver further comprises an update interface between the fixed hardware circuit and the processor for providing the processing parameter to the fixed hardware circuit.

According to a second aspect, the invention relates to a computer program loadable by a program interface of the processor of the optical receiver according to the first aspect as such or according to the any of the preceding implementation forms of the first aspect, the computer program implementing an adaptation of the processing parameter.

According to a third aspect, the invention relates to an optical transmission system with an optical receiver according to the thirteenth implementation form of the first aspect, the optical receiver being an optical coherent receiver using a die stack to integrate the fixed hardware circuit and the processor into the package, wherein the processing parameter is reconfigured by the update interface.

BRIEF DESCRIPTION OF THE DRAWINGS

Further embodiments of the invention will be described with respect to the following figures, in which.

DETAILED DESCRIPTION OF ILLUSTRATIVE EMBODIMENTS

Figure 1:
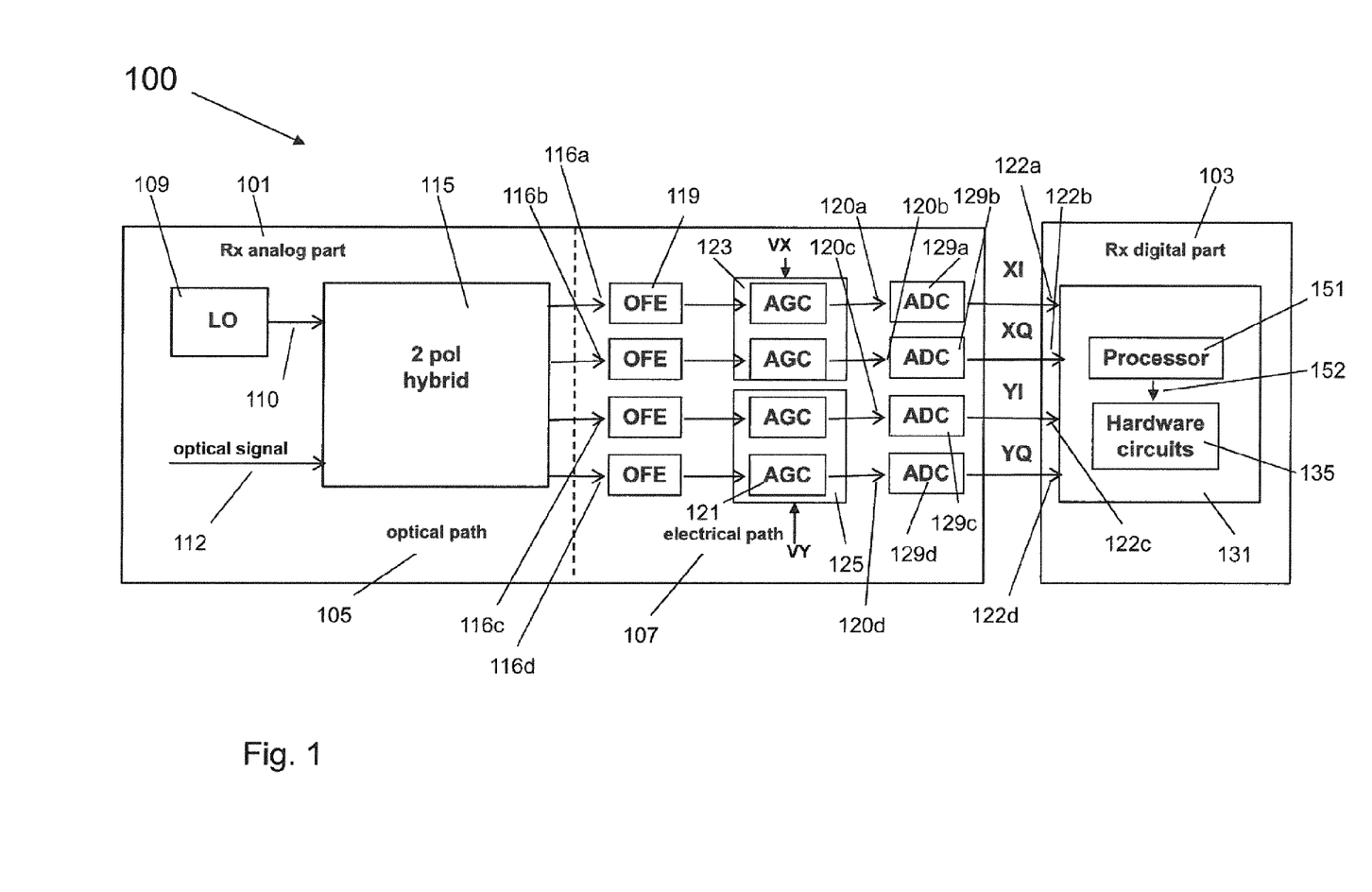
FIG. 1 shows a block diagram of an optical receiver according to an implementation form.

FIG. 1 shows a block diagram of an optical receiver 100, in particular a coherent optical receiver, according to an implementation form. The optical receiver 300 comprises an RX analog part 101 and an RX digital part 103, wherein the RX analog part 101 comprises an optical path 105 and an electrical path 107. The optical path 105 comprises a local oscillator 109 and a 90° hybrid 115. The electrical path 107 comprises four optical front ends 119, four automatic gain control blocks 121 and four analog-to-digital converters 129a, 129b, 129c, 129d. The RX digital part 103 comprises a semiconductor package 131 integrating a fixed hardware circuit 135 and a processor 151. The fixed hardware circuit 135 implements a signal processing part for processing an optical receive signal 122a, 122b, 122c, 122d by using a processing parameter 152. The processor 151 is configured to adaptively update the processing parameter 152. The optical receive signal 122a, 122b, 122c, 122d processed by the fixed hardware circuit 135 is a digital representation of the optical signal 112 received by the optical receiver 100. It comprises an in-phase component XI, YI and a quadrature component XQ, YQ for each polarization X, Y of the received optical signal 112.

Since the digital signal is mapped into both polarizations the 90° hybrid 115 is used to mix the input signal, i.e. the received optical signal 112, with the local oscillator (LO) 109 signal 110 that results in four optical output signals 116a, 116b, 116c, 116d, two output signals per polarization, where the output signals 116a and 116b represent the x-polarization part and the output signals 116c and 116d represent the y-polarization part. The optical output signals 116a, 116b, 116c, 116d are converted to electrical signals via the optical front ends (OFE) 119 comprising photo diodes (single PIN or balanced) and a transimpedance amplifier (TIA).

As the signal power may vary over time, the fast automatic gain control blocks (AGC) 121 compensate for signal power variations. There are four AGC blocks 121, wherein a first part 123 of the AGC blocks 121 is controlled by one control signal which is denoted with VXAGC for X polarization and a second part 125 of the AGC blocks 121 is controlled by one control signal which is denoted with VYAGC for Y polarization. The output signals 120a, 120b, 120c and 120d of the AGC blocks 121 are quantized by the use of the corresponding analog-to-digital converter (ADC) 129a, 129b, 129c and 129d obtaining four quantized digital data streams XI 122a, XQ 122b, YI 122c and YQ 122d representing the optical receive signal for the RX digital part 103.

The four quantized digital data streams XI 122a, XQ 122b, YI 122c and YQ 122d are processed in the (digital) signal processing part of the fixed hardware circuit 135 of the semiconductor package 131. The semiconductor package 131 integrates the fixed hardware circuit 135 and the processor 151 in one chip. In the fixed hardware circuit 135 signal processing is performed, which is e.g. Fourier processing, compensation for chromatic dispersion and polarization mode dispersion and Inverse Fourier processing. The processor 151 is used to adaptively update the processing parameter 152 which may be a set of CD compensation coefficients or a set of PMD compensation coefficients. In an implementation form, the processor 151 performs CD estimation to update the CD compensation coefficients based on the estimated CD. In an implementation form, the processor 151 performs PMD estimation to update the PMD compensation coefficients based on the estimated PMD. In an implementation form, the processor 151 performs timing recovery, frame synchronization and carrier frequency and phase estimation.

Figure 2:
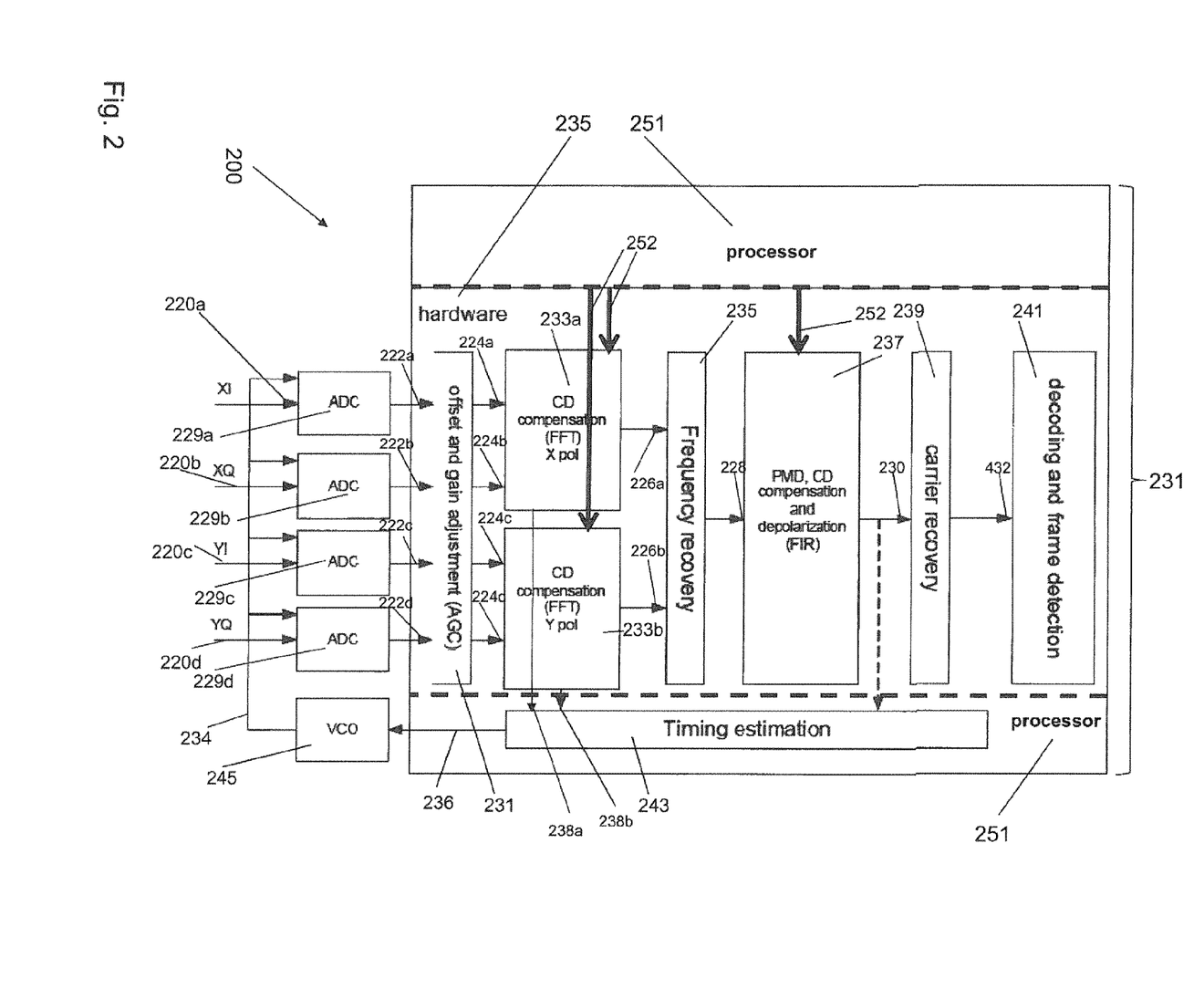
FIG. 2 shows a block diagram of an optical receiver according to an implementation form.

FIG. 2 shows a block diagram of an optical receiver 200, in particular a coherent optical receiver, with a fixed hardware circuit 235 and a processor 251 according to an implementation form. A package 231 is used to integrate the fixed hardware circuit 235 and the processor 251 to one chip. The fixed hardware circuit 235 may correspond to the fixed hardware circuit 135 as described with respect to FIG. 1, the processor 251 may correspond to the processor 151 as described with respect to FIG. 1 and the package 231 may correspond to the package 131 as described with respect to FIG. 1. The optical receiver 200 further comprises four analog-to-digital converters 229a, 229b, 229c and 229d which may correspond to the four analog-to-digital converters 129a, 129b, 129c and 129d as described with respect to FIG. 1. The output signals 220a, 220b, 220c and 220d of the AGC blocks not depicted in FIG. 2 are quantized by the use of the corresponding analog-to-digital converter 229a, 229b, 229c, 229d obtaining four quantized digital data streams 222a, 222b, 222c and 222d which are inputs to an offset and gain adjustment unit 231.

The basic hardware blocks are presented in FIG. 2. After offset and gain correction in the offset and gain adjustment unit 231 the obtained four signals 224a, 224b, 224c and 224d are equalized for chromatic dispersion in frequency domain using two fast Fourier transformation (FFT) equalizing units 233a and 233b, a first FFT equalizing unit 233a is used for equalizing the X polarization comprising the first two signals 224a and 224b and a second FFT equalizing unit 233b is used for equalizing the Y polarization comprising the second two signals 224c and 224d. Both FFT equalizing units 233a, 233b use compensation parameters which are processing parameters 252 for performing the equalization. The processor 251 adaptively updates the processing parameters 252 and provides them to the FFT equalizing units 233a, 233b. The first FFT block 233a provides a CD-equalized signal 226a with respect to X-polarization and the second FFT block 233b provides a CD-equalized signal 226b with respect to Y-polarization. The frequency offset is removed in a frequency recovery block 235 receiving the CD-equalized signal 226a with respect to X-polarization and receiving the CD-equalized signal 226b with respect to Y-polarization.

Polarization tracking, PMD compensation and residual CD compensation are done in time domain using finite impulse response (FIR) filters 237 arranged in butterfly structure. The FIR filters 237 receive the output of the frequency recovery block 235 and provide an output signal 230 which is input to a carrier recovery unit 239. PMD compensation and residual CD compensation use compensation parameters which are processing parameters 252 for performing the compensation. The processor 251 adaptively updates the processing parameters 252 and provides them to the FIR filters 237.

Both residual frequency offset and carrier phase recovery are done in the carrier recovery unit 239. When differential decoding is applied at the transmitter side, a differential decoder is used in a decoding and frame detection unit 241 which receives the output signal 232 of the carrier recovery unit 239.

A timing estimation unit 243 implemented in the processor 251 receives the output signal 230 of the FIR filters 237, a first control signal 238a of the first FFT block 233a and a second control signal 238b of the second FFT block 233b and provides a timing signal 236 to a voltage controlled oscillator (VCO) 245 providing the clock signals 234 for the four analog-to-digital converters 229a, 229b, 229c and 229d.

Figure 3:
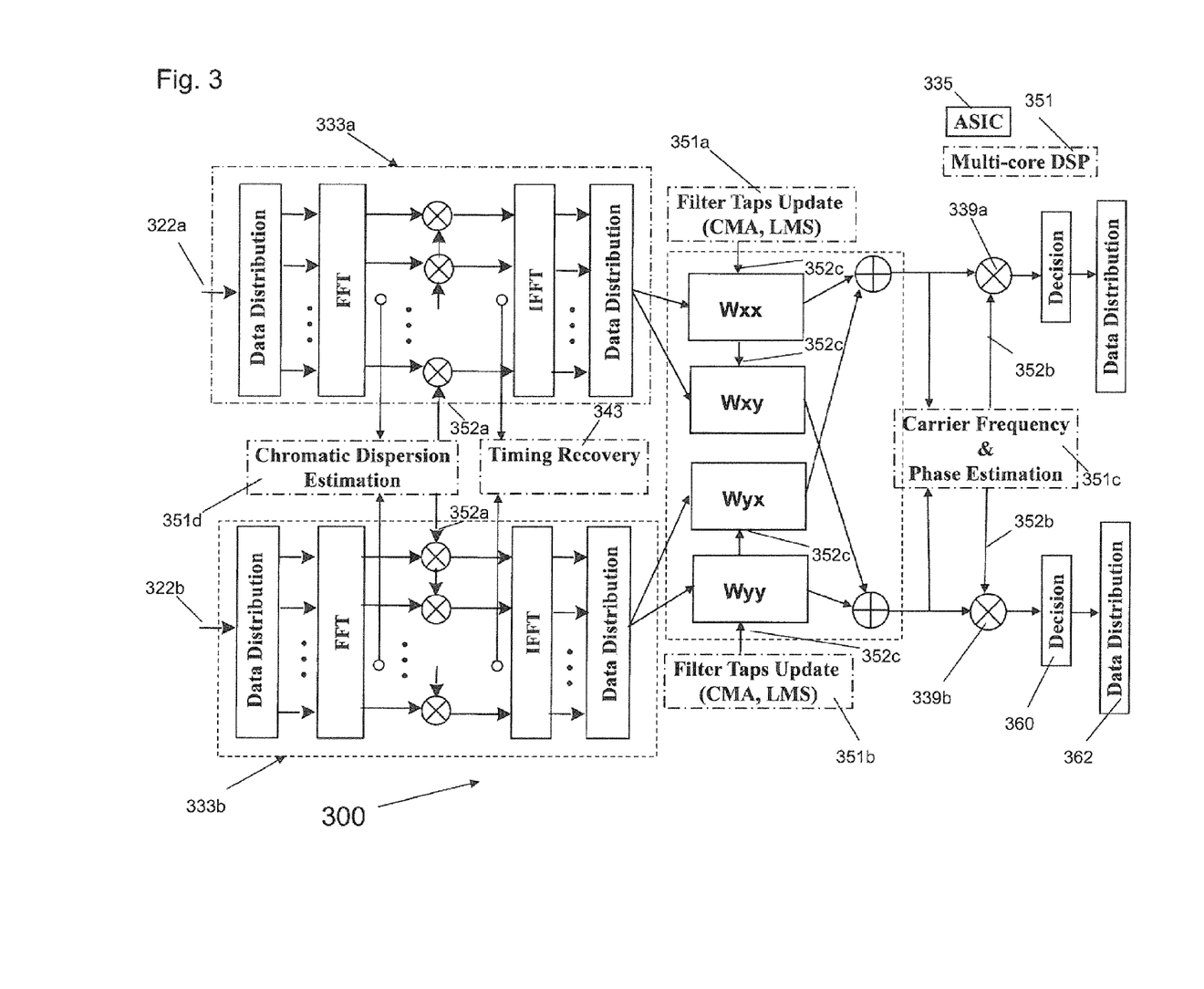
FIG. 3 shows a block diagram of an optical receiver according to an implementation form.

FIG. 3 shows a block diagram of an optical receiver 300, in particular a coherent optical receiver, according to an implementation form. FIG. 3 illustrates a flexible architecture for the optical receiver for potential evolution of the digital coherent receiver for high speed optical transmission. FIG. 3 illustrates the digital part of the optical receiver 300 which may correspond to the RX digital part 103 with respect to the description of FIG. 1 or to the semiconductor package 231 with respect to the description of FIG. 2 and thus is also called coherent digital receiver 300. The coherent digital receiver 300 comprises four modules which are a Frequency domain equalizer (FDEQ) 333a, 333b for compensating the chromatic dispersion, a Time domain equalizer (TDEQ) 337 for de-multiplexing the orthogonally polarized signals and compensating the polarization mode dispersion, a Timing recovery (TR) unit 343 for catching and tracking the timing of the symbols and a Carrier recovery (CR) unit 339a, 339b for compensating the frequency offset and phase offset between the Tx-laser and the Rx-laser. The Frequency domain equalizer (FDEQ) 333a, 333b comprises two parts, a first part 333a for equalizing the X-polarization component 322a of the optical receive signal and a second part 333b for equalizing the Y-polarization component 322b of the optical receive signal. The optical receive signal 322a, 322b is represented as a digital signal which may correspond to the four quantized digital data streams 222a, 222b, 222c and 222d output from the four ADCs 229a, 229b, 229c, 229d described with respect to FIG. 2 or which may correspond to the four quantized digital data streams XI 122a, XQ 122b, YI 122c and YQ 122d output from the RX analog part 101 described with respect to FIG. 1.

The optical receive signal 322a, 322b passes the frequency domain equalizer 333a, 333b and the time domain equalizer 337 and is corrected by the carrier frequency and phase estimation unit 351c. The corrected optical receive signal then passes a decision stage 360 and a data distribution stage 362.

The time domain equalizer 337 and the frequency domain equalizer 333a, 333b operate symbol-by-symbol. That means every symbol of the sampled optical receive signal 322a, 322b is processed by these operations. Both, the time domain equalizer 337 and the frequency domain equalizer 333a, 333b are implemented by a fixed hardware circuit 335 which may be an ASIC. On the other hand, the time domain equalizer tap-updating 351a, 351b, the timing recovery 343 and the carrier recovery updating 351c operate in a slower rate and are thus implemented by a processor 351, e.g. a multi-core digital signal processor. Furthermore, the time domain equalizer 337 and the frequency domain equalizer 333a, 333b are two modules which are compatible for PDM-(D)BPSK, PDM-(D)QPSK, PDM-16QAM. They are fixed parts of the digital signal processing and thus implemented in a fixed hardware circuit 335. The flexible digital signal processing parts which are the tap-updating of the FIR filters 351a, 351b, the tap calculation of the frequency domain equalizer 351d, parts of the timing recovery 343 and the carrier recovery updating 351c are implemented by the processor 351. Both, the processor 351 and the fixed hardware circuit 335 are integrated on one chip forming a semiconductor package.

The tap-updating parts 351a, 351b of the FIR filters use an update interface 352c to update the taps of the FIR filters Wxx, Wxy, Wyx, Wyy of the time domain equalizer 337. The tap updating may be performed by an LMS algorithm or a CMA algorithm. The tap calculation of the frequency domain equalizer which is performed by the chromatic dispersion estimation unit 351d uses an update interface 352a to update the taps of the frequency domain equalizer 333a, 333b. The frequency and phase correction which is done by the carrier frequency and phase estimation unit 351c uses an update interface 352b to correct the frequency and phase of the received optical signal.

The optical receiver 300 implements a hybrid ASIC/multi-DSP architecture design, which realizes the fixed parts in ASIC 335 and the flexible parts in programmable multi-core DSP 351. There are data exchange interfaces between the two parts 335, 351 which are the update interfaces 352a, 352b and 352c and a not depicted program interface of the processor 351 for loading and/or updating a computer program in the processor 351. In an implementation form, the clock speed of the two parts 351 and 335 is different. In an implementation form, the flexible DSP in Multi-core DSP is upgraded to a new version without affecting the design of the fixed parts in ASIC 335. The program interface is used to renew the algorithm in the programmable Multi-core DSP 351. In an implementation form, the die-stacking technologies are used to implement the fixed-part 335 and flexible part 351 in different dies.

Figure 4:
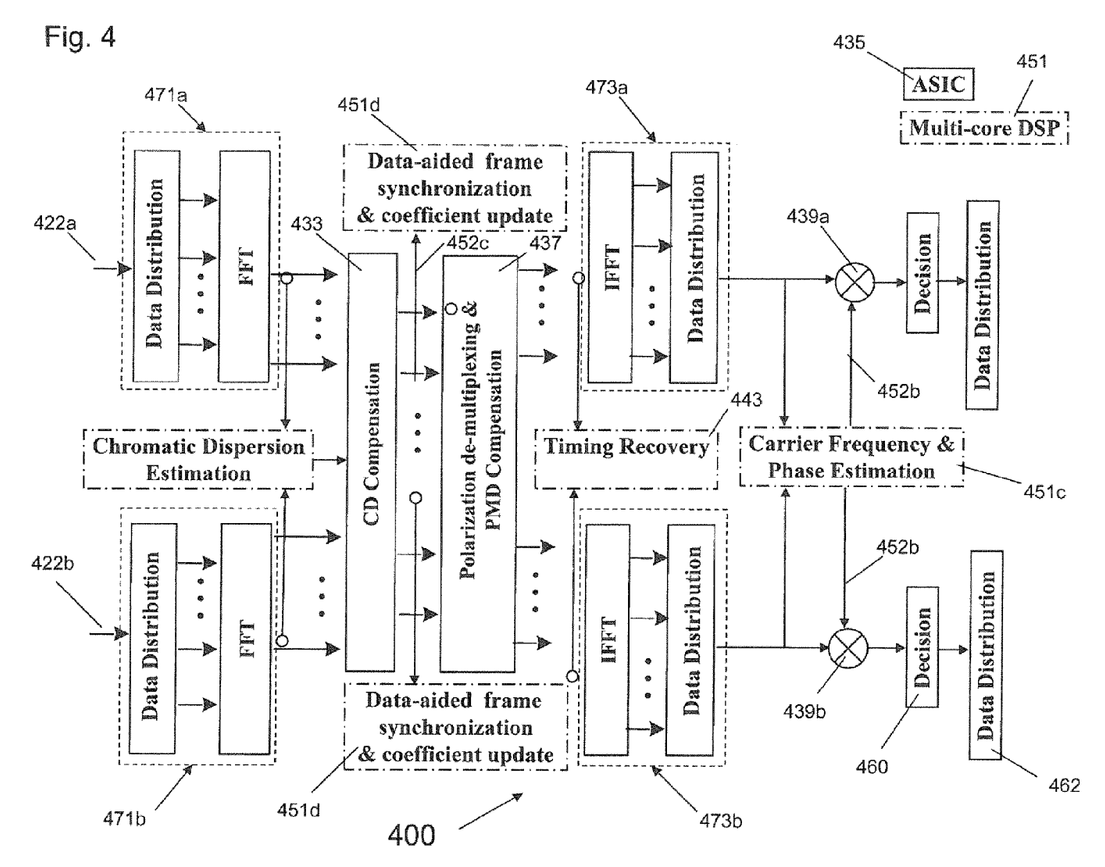
FIG. 4 shows a block diagram of an optical receiver according to an implementation form.

FIG. 4 shows a block diagram of an optical receiver 400, in particular a coherent optical receiver, according to an implementation form. FIG. 4 illustrates a flexible architecture for the optical receiver for potential evolution of the digital coherent receiver for high speed optical transmission. FIG. 4 illustrates the digital part of the optical receiver 400 which may correspond to the RX digital part 103 with respect to the description of FIG. 1 or to the semiconductor package 231 with respect to the description of FIG. 2 and thus is also called coherent digital receiver 400. The coherent digital receiver 400 comprises four modules which are a first frequency domain equalizer 433 for compensating the chromatic dispersion, a second frequency domain equalizer 437 for compensating the polarization mode dispersion, a timing recovery unit 443 for catching and tracking the timing of the symbols and a carrier recovery unit 439a, 439b for compensating the frequency offset and phase offset between the Tx-laser and the Rx-laser.

The first frequency domain equalizer 433 equalizes the X-polarization component 422a of the optical receive signal which passes a data distribution and FFT unit 471a before being provided as frequency samples to the first frequency domain equalizer 433. The first frequency domain equalizer 433 equalizes the Y-polarization component 422b of the optical receive signal which passes a data distribution and FFT unit 471b before being provided as frequency samples to the first frequency domain equalizer 433. The optical receive signal 422a, 422b is represented as a digital signal which may correspond to the four quantized digital data streams 222a, 222b, 222c and 222d output from the four ADCs 229a, 229b, 229c, 229d described with respect to FIG. 2 or which may correspond to the four quantized digital data streams XI 122a, XQ 122b, YI 122c and YQ 122d output from the RX analog part 101 described with respect to FIG. 1.

The optical receive signal 422a, 422b passes the data distribution and FFT units 471a and 471b, the first frequency domain equalizer 433 and the second frequency domain equalizer 437, further passes IFFT and data distribution units with respect to X polarization 473a and Y polarization 473b parts and is corrected by the carrier frequency and phase estimation unit 451c. The corrected optical receive signal then passes a decision stage 460 and a data distribution stage 462.

The first and the second frequency domain equalizers 433, 437 operate symbol-by-symbol. That means every symbol of the sampled optical receive signal 422a, 422b is processed by these operations. Both frequency domain equalizer 433, 437 are implemented by a fixed hardware circuit 435 which may be an ASIC. On the other hand, the coefficient updating 451d of both frequency domain equalizers 433, 437, the timing recovery 443 and the carrier frequency and phase estimation 451c operate in a slower rate and are thus implemented by a processor 451, e.g. a multi-core digital signal processor. Furthermore, the frequency domain equalizers 433 and 437 are two modules which are compatible for PDM-(D)BPSK, PDM-(D)QPSK, PDM-16QAM. They are fixed parts of the digital signal processing and thus implemented in a fixed hardware circuit 435. The flexible digital signal processing parts which are the coefficient updating 451d of the frequency domain equalizers 433, 437, parts of the timing recovery 443 and the carrier frequency and phase estimation 451c are implemented by the processor 451. Both, the processor 451 and the fixed hardware circuit 435 are integrated on one chip forming a semiconductor package.

The coefficient updating parts 451d of the frequency domain equalizers 433, 437 use an update interface 452c to update the coefficients of the frequency domain equalizers 433, 437. The coefficient updating may be performed by an LMS algorithm or a CMA algorithm. The frequency and phase correction 439a, 439b which is done by the carrier frequency and phase estimation unit 451c uses an update interface 452b to correct the frequency and phase of the received optical signal.

The optical receiver 400 implements a hybrid ASIC/multi-DSP architecture design, which realizes the fixed parts in ASIC 435 and the flexible parts in programmable multi-core DSP 451. There are data exchange interfaces between the two parts 435, 451 which are the update interfaces 452*b*, 452*c* and a not shown program interface of the processor 451 for loading and/or updating a computer program in the processor 451. In an implementation form, the clock speed of the two parts 451 and 435 is different. In an implementation form, the flexible DSP in a Multi-core DSP is upgraded to a new version without affecting the design of the fixed parts in ASIC 435. The program interface is used to renew the algorithm in the programmable Multi-core DSP 451. In an implementation form, die-stacking technologies are used to implement the fixed-part 435 and flexible part 451 in different dies.

From the foregoing, it will be apparent to those skilled in the art that a variety of devices, methods, systems, computer programs on recording media, and the like, are provided.

The present disclosure also supports a computer program product including computer executable code or computer executable instructions that, when executed, causes at least one computer to execute the performing and computing steps described herein.

The present disclosure also supports a system configured to execute the performing and computing steps described herein.

Many alternatives, modifications, and variations will be apparent to those skilled in the art in light of the above teachings. Of course, those skilled in the art readily recognize that there are numerous applications of the invention beyond those described herein. While the present inventions has been described with reference to one or more particular embodiments, those skilled in the art recognize that many changes may be made thereto without departing from the scope of the present invention. It is therefore to be understood that within the scope of the appended claims and their equivalents, the inventions may be practiced otherwise than as specifically described herein.

What is claimed is:

1. An optical receiver for processing an optical receive signal, the optical receiver comprising:
   a fixed hardware circuit configured to process compensation for polarization mode dispersion using a processing parameter, wherein the processing parameter comprises polarization mode dispersion compensation coefficients;
   a processor configured to adaptively update the processing parameter, wherein the fixed hardware circuit operates at a higher data rate than the processor, wherein the fixed hardware circuit is configured to process the optical receive signal at a symbol rate of the optical receive signal, and wherein the processor is configured to update the processing parameter at a fractional part of the symbol rate of the optical receive signal; and
   packaging material integrating the fixed hardware circuit and the processor into a single package.

2. The optical receiver of claim 1, wherein the fixed hardware circuit is implemented as an application specific integrated circuit (ASIC).

3. The optical receiver of claim 1, wherein the processor is implemented as a multi-core Digital Signal Processor (DSP).

4. The optical receiver of claim 1, wherein the fixed hardware circuit is further configured to process compensation for chromatic dispersion, and wherein the processing parameter comprises chromatic dispersion compensation coefficients.

5. The optical receiver of claim 4, wherein the fixed hardware circuit comprises a frequency-domain equalizer.

6. The optical receiver of claim 1, wherein the fixed hardware circuit comprises a frequency-domain equalizer.

7. The optical receiver of claim 1, wherein the fixed hardware circuit comprises a time-domain equalizer.

8. The optical receiver of claim 1, wherein the processor comprises a program interface for updating a computer program in order to fit different applications or performance requirements, the computer program implementing an adaptation of the processing parameter.

9. The optical receiver of claim 1, wherein the fixed hardware circuit and the processor are implemented on different dies.

10. The optical receiver of claim 9, wherein the different dies are mounted on top of each other within the single package.

11. The optical receiver of claim 1, further comprising an update interface between the fixed hardware circuit and the processor for providing the processing parameter to the fixed hardware circuit.

12. An optical transmission system with an optical receiver according to claim 11, the optical receiver being an optical coherent receiver using a die stack to integrate the fixed hardware circuit and the processor into the single package.

13. The optical transmission system of claim 12, wherein the processing parameter is reconfigured by the update interface.

* * * * *